United States Patent Office 3,568,403
Patented Mar. 9, 1971

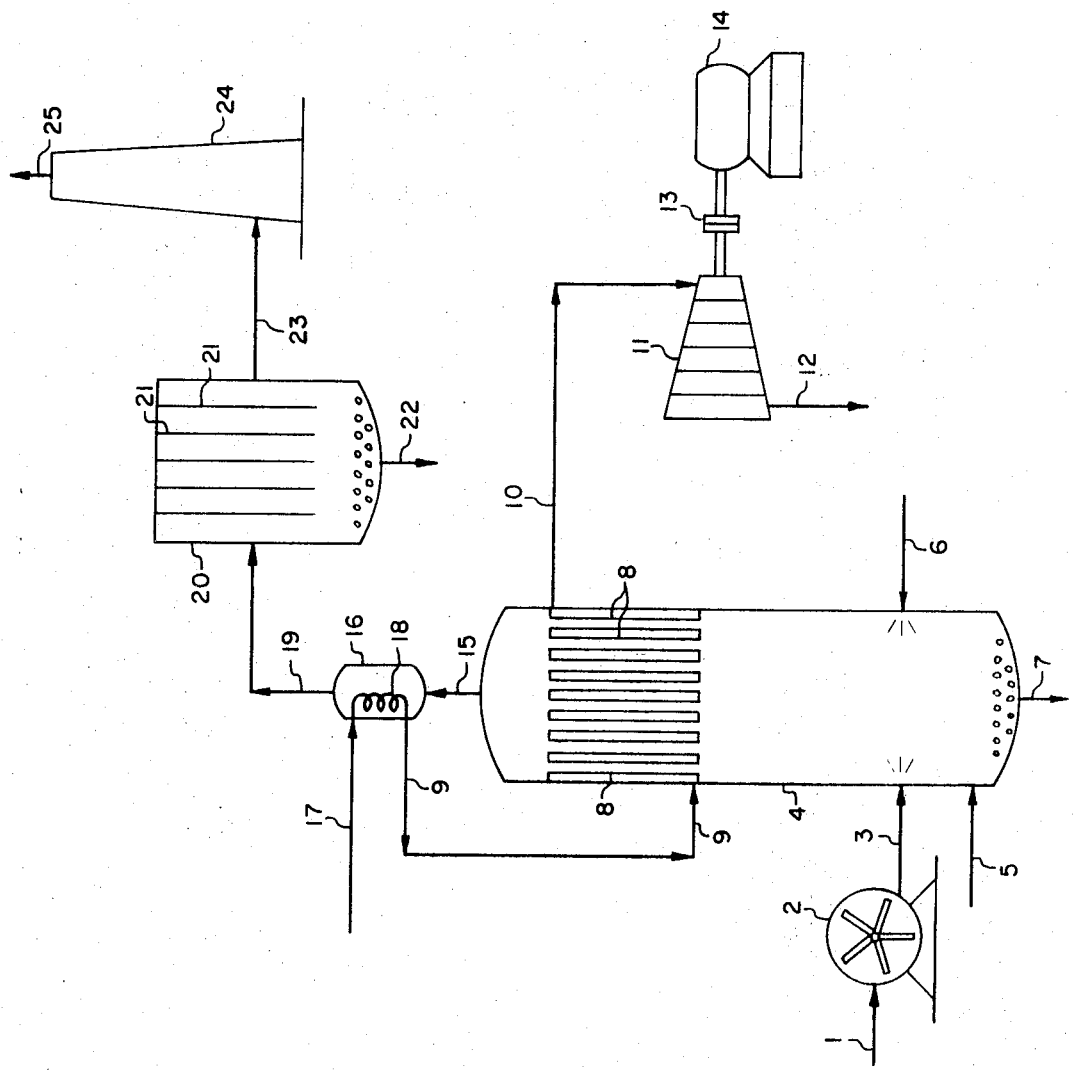

3,568,403
REMOVAL OF SOLIDS FROM FLUE GAS
Harry L. Richardson, Pittsburgh, Pa., assignor to Chemical Construction Corporation, New York, N.Y.
Filed June 21, 1966, Ser. No. 559,140
The portion of the term of the patent subsequent to Mar. 19, 1987, has been disclaimed
Int. Cl. B03c 3/01
U.S. Cl. 55—5
10 Claims

ABSTRACT OF THE DISCLOSURE

Improved electrostatic precipitation of entrained solids from flue gas, which is generated by burning sulfur-containing solid carbonaceous fuel, is attained by burning a vanadium-containing liquid hydrocarbon such as high vanadium content crude oil or refinery residual oil together with the solid fuel. The vanadium which is thus added to the combustion process is converted to vanadium pentoxide which causes at least partial catalytic oxidation of sulfur dioxide to sulfur trioxide, which provides improved results and greater efficiency during subsequent treatment of the flue gas by electrostatic precipitation, in terms of greater solids removal from the flue gas.

---

The present invention relates to the removal of entrained solids such as fly ash from flue gas generated by the combustion of sulfur-containing solid carbonaceous particles. In a typical application such as a coal-fired steam power plant, improved electrostatic precipitation of entrained solids from the flue gas is attained by burning a vanadium-containing liquid hydrocarbon such as high vanadium content crude oil or refinery residual oil together with the coal. The vanadium which is thus added to the combustion process apparently is at least partially converted to vanadium pentoxide and thus causes at least partial catalytic oxidation of sulfur dioxide to sulfur trioxide, which provides improved results during the subsequent electrostatic precipitation in terms of greater solids removal from the flue gas.

Numerous procedures have been suggested in the prior art for producing improved or greater removal of entrained solids from a gas stream by electrostatic precipitation, which is also known as the Cottrell procedure. In this procedure, the gas stream is passed through a high voltage electrical field with resultant deposition of entrained solids on the electrodes. One of the problems encountered in the electrostatic precipitation procedure involves high resistivity of the gas stream to electrical discharge flow. Another problem involves the formation of a relatively dense and impenetrable coating of solids build-up on the electrodes, which tends to inhibit further deposition of solids by reducing electric current flow. The prior art teaches the use of various additives or components which are added to the gas stream to produce more effective electrostatic precipitation of entrained solids. The collection efficiency of an electrostatic precipitator is dependent on the conductivity of the collected material when deposited on the grounded (positive) collecting electrodes. If this charged material does not lose its charge to the collecting electrode a balanced voltage is established in the treating field to reduce or nullify any further forces for collection. This conductivity has been noted as critical in the range of $10 \times 10^{10}$ ohms/cm. Additives in the range of 30 p.p.m. based on the weight of gas have often produced spectacular results. Thus, U.S. Pats. Nos. 1,883,372 and 1,883,373 suggest the addition of a hydrocarbon to the gas stream in vapor or mist form to aid in or increase the electrostatic precipitation of solids from gas streams such as blast furnace gas. U.S. Pat. 1,413,993 teaches the addition of carbon smoke to the gas stream to increase the precipitation of solids, while U.S. Pat. 1,331,225 discloses the addition of solid conducting material such as iron oxide in particle form to the gas stream, or the coating of the electrodes with iron oxide, to increase the electrostatic precipitation effect. U.S. Pat. 1,983,338 teaches the addition of atomized tar to the gas stream to flush the electrodes. U.S. Pat. No. 2,382,562 proposes the addition of chloride ion as sodium chloride to increase the recovery of zinc sulfide roaster gases. In U.S. Pat. No. 2,305,872, vapors of halogenated hydrocarbons are added to the gas stream to increase the precipitation of solids. A thin film or mist of a liquid having electrical conductivity, such as sulfuric acid is provided in U.S. Pat. 1,522,143, while in U.S. Pat. 2,602,734 sulfuric acid or sulfur trioxide is added to roaster gases to increase the electrostatic precipitation of solids. Finally, U.S. Pat. 2,841,242 teaches the addition of ozone to a flue gas containing sulfur dioxide and entrained solids, to produce sulfur trioxide and increase the electrostatic precipitation of solids.

Numerous industrial facilities burn a solid fuel consisting of solid carbonaceous particles, such as coal, lignite or peat. In many instances, the fuel contains sulfur, either as free sulfur, pyrites or organically bound sulfur. The sulfur content of the fuel is converted to sulfur dioxide by the combustion process. The final cooled combustion gas remaining after heat recovery, known generally as flue gas is discharged to the atmosphere and will contain the sulfur dioxide generated by combustion of the fuel, as well as entrained solid particles usually designated as fly ash. Due to air pollution restrictions, which are continually becoming more stringent, it is necessary to remove most of the fly ash from the flue gas before it is discharged to the atmosphere. This problem is especially prevalent in steam-electric power plants which are located near large metropolitan areas and burn pulverized coal, and which generate large amounts of flue gas containing fly ash and sulfur dioxide. In most instances, the cooled flue gas is subjected to various treatments prior to discharge to the atmosphere, in order to comply with air pollution regulations of the metropolitan area in which the power plant is located. One of the most commonly employed procedures for removal of fly ash from flue gas is electrostatic precipitation, however only a partial removal of fly ash and almost no removal of sulfur dioxide is accomplished by this method in conventional facilities and consequently most power plants are also equipped with large and costly stacks which serve to discharge the treated flue gas into the atmosphere at a high elevation above ground level.

In the present invention, an improved procedure is provided for the removal of entrained solids from a combustion gas stream derived from the combustion of sulfur-containing solid carbonaceous particles such as coal. As described supra, such a combustion gas stream will contain sulfur dioxide in addition to entrained solid particles. It has been determined that the concomitant combustion of a vanadium-containing liquid hydrocarbon together with the solid carbonaceous fuel produces highly advantageous results, when the combustion gas is subsequently subjected to electrostatic precipitation. The presence of vanadium results in the in situ conversion of at least a portion of the sulfur dioxide to sulfur trioxide, with resultant highly beneficial results during the subsequent electrostatic precipitation in terms of improved electrical conductivity and greater deposition of solids from the gas stream on the electrodes, with the resultant production of a cleaner effluent combustion gas suitable for discharge to the atmosphere. Another advantage of the procedure is that essentially all of the sulfur trioxide which is formed during combustion is collected with the deposited solids, and thus the net discharge of sulfur dioxide in the final effluent combustion gas is substantially reduced. A further advantage is that the liquid hydrocarbon introduced into the combustion procedure also possesses an inherent fuel value with a cost per 1000 B.t.u. in the range of the base fuel cost, and thus an additive component is provided for combustion facilities employing solid carbonaceous material which also has an economic fuel value which is utilized in the combustion facility, as compared to the extraneous prior art additives discussed supra, which are injected into the gas stream subsequent to combustion and heat utilization.

Various types of vanadium-containing liquid hydrocarbons are eminently suitable for utilization in the procedure of the present invention. One suitable material consists of any of the various high-vanadium crude oils such as are produced in Venezuela. Thus, conventional crude oils usually contain less than 10 parts per million (p.p.m.) of vanadium, while most Venezuelan crudes contain over 50 p.p.m. of vanadium. The vanadium content of Lagomedio Venezuelan crude oil for example, analyzes about 135 p.p.m. of vanadium, while Boscan Venezuelan crude oil contains about 1200 p.p.m. of vanadium. Another highly suitable liquid hydrocarbon consists of the heavy residual oil produced as a byproduct of petroleum refining and generally designated as Bunker C fuel oil or #6 fuel oil. During the distillation step in petroleum refining, the vanadium concentrates in the residual bottoms, and thus heavy residual oil will usually contain at least 50 p.p.m. or as much as 600 p.p.m. or more of vanadium content, even though the vanadium content of the original crude oil prior to refining may have been in a conventional low range. This is particularly true for the so called "Dubbs bottoms."

It is an object of the present invention to provide an improved procedure for the removal by electrostatic precipitation of entrained solids from the combustion gas stream produced by the combustion of sulfur-containing solid carbonaceous material.

Another object is to improve the electrostatic precipitation of fly ash from flue gas produced by the combustion of sulfur-containing coal.

A further object is to utilize a vanadium-containing liquid hydrocarbon to improve the performance and solids removal effect of electrostatic precipitators employed to remove entrained solids from a combustion off-gas stream produced by the combustion of a sulfur-containing solid carbonaceous material.

An additional object is to reduce the emission of sulfur dioxide from a combustion process employing a sulfur-containing solid carbonaceous fuel.

Still another object is to at least partially convert the sulfur dioxide formed by combustion of a sulfur-containing solid carbonaceous fuel to sulfur trioxide in the internal transport zone.

Still a further object is to introduce a small but effective amount of vanadium into the combustion zone of a combustion process employing a sulfur-containing solid carbonaceous fuel, so as to produce in situ conversion of at least a portion of the sulfur dioxide produced by the combustion process to sulfur trioxide.

These and other objects and advantages of the present invention will become evident from the description which follows. Referring to the figure, a flowsheet of a preferred embodiment of the present invention is provided, as applied to the removal of fly ash by electrostatic precipitation from the flue gas produced by combustion of sulfur-containing pulverized coal in a steam-electric power plant.

Solid coal stream 1 is passed into pulverizer 2, which consists of a ball or hammer mill or other suitable device for reducing solid coal to a powder or pulverized state. Coal stream 1 will typically have a sulfur content in the range of 0.2% to 6.0% by weight. The resulting pulverized coal stream 3 discharged from unit 2 by transport, or "primary" air is passed into the lower combustion zone of steam boiler 4, together with combustion air stream 5. There may be a multiplicity of burner feed streams 6, and one or more of these streams 6 are fired with a vanadium-containing liquid hydrocarbon such as Venezuelan crude oil or residual oil, which preferably contains at least 50 p.p.m. of vanadium, and which is passed into the combustion zone of boiler 4 together with combustion air. A combustion reaction takes place in the combustion zone of unit 4 between streams 5 and streams 3 and 6, with the resultant generation of a hot combustion gas stream. The sulfur content of stream 3 is initially converted to sulfur dioxide by the combustion reaction. Due to the elevated temperature, most, if not all, of the sulfur is converted to sulfur dioxide in the combustion zone. In order to provide an effective concentration of vanadium in a subsequent reaction zone, the mass feed rate of stream 6 will usually be at least 5% of the feed rate of stream 3, and may be as high as 20% or more of the feed rate of stream 3.

The hot combustion gas thus formed in the lower combustion zone of unit 4 will contain most, if not all, of the sulfur as sulfur dioxide in the flue gases transporting the fly ash. Some 15% of the residual ash derived from stream 3 will be deposited in the bottom of unit 4 as ash or clinker which is removed via stream 7, while the hot combustion gas rises through unit 4 and passes upwards through the vertical superheater and boiler tubes 8 in the upper part of unit 4. Pressurized and preheated boiler feed water stream 9 is passed into unit 4 and subsequently to tubes 8, and is vaporized by heat exchange with the hot combustion gas passing through tubes 8. The resulting high pressure steam stream 10 is passed into steam turbine 11, and expands to a lower temperature and pressure within unit 11 thus performing useful work in rotating turbine 11. Exhaust steam stream 12 discharged from unit 11 is usually condensed to liquid water by heat exchange with cooling water, and is recycled for further steam generation as condensate water. Turbine 11 is connected by shaft coupling 13 to electric generator 14 and rotates unit 14, thus serving to generate useful electric power.

Returning to unit 4, the cooled combustion gas stream 15 is removed from unit 4 above tubes 8, and is now usually passed through one or a series of heat economizers such as boiler feed water preheater 16. Boiler feed water stream 17, which may be derived from the condensation of stream 12, is passed into coil 18 within unit 16 and is heated. The hot boiler feed water is removed from coil 18 as stream 9. In the gas transport system through boiler 4 the ambient temperatures preclude the presence of sulfur trioxide until these gases are in the boiler tube section 8. Inasmuch as the solid fuel is subjected to an adiabatic surface temperature of something on the order of 2500° C. and is in the gas transport system mentioned supra for some 1.7 seconds, the applicable stoichiometric laws preclude the presence of more than traces of sulfur trioxide. At the point of entry to the economizer section of tubes 8 or unit 16 the ambient thermal conditions allow a formation of sulfur trioxide. In the presence of a catalyst this formation, in the presence of oxygen, is extremely rapid at ambient temperatures in the 600–800° F. range. Cooled combustion or flue gas stream 19 removed from unit 16 now contains residual fly ash and sulfur dioxide, as well as sulfur trioxide produced as described supra. Stream 19 is now subjected to electrostatic precipitation, which takes place in an electrostatic precipitator 20 provided with electrodes 21. Unit 20 is a conventional unit for the selective removal of entrained solids such as fly ash from a gas stream by the provision of a high voltage electrical field, and may be similar to the units described in the U.S. patents cited supra. Deposited fly ash solids are periodically, or continuously, removed from electrodes 21 by conventional means, and are collected in the bottom of unit 20 and removed as stream 22. Due to the presence of sulfur trioxide in stream 19, highly efficient solids removal takes place in unit 20 due to the increased soluble sulfate sulfur content of the fly ash and resultant reduced ash resistivity to electric current flow.

The resulting flue gas stream 23 discharged from unit 20 now contains only very minor residual proportions of fly ash and sulfur dioxide, and is relatively innocuous and is suitable for discharge to the atmosphere without adverse air pollution effects. Stream 23 is passed to stack 24 and is discharged to the atmosphere via stream 25.

Numerous alternatives within the scope of the present invention will occur to those skilled in the art. Thus, the ranges of process variables and proportions of feed streams mentioned supra are preferred ranges of these variables for optimum results, and the process may be operated outside of these ranges of variables in suitable instances. In most instances however, stream 6 will contain at least 50 p.p.m. of vanadium for effective results in terms of sulfur trioxide formation. In this respect, it will be apparent that essentially all of the sulfur trioxide formed in unit 4 will be eliminated from the system as absorbed, adsorbed or reacted sulfur trioxide in streams 7 and 22, and consequently the sulfur dioxide content of stream 25 discharged to the atmosphere is substantially reduced as compared to conventional installations in which stream 6 is omitted.

In some facilities stream 1 may be passed directly into unit 4 without prior pulverization, and unit 2 and its function may be omitted. Unit 16 and its function may be omitted in some instances, or coil 18 may be disposed in unit 4 above tubes 8 in some cases. Unit 4 has been described and illustrated as being a firetube boiler with hot combustion gas passing through the tubes 8, however in other instances unit 4 may alternatively consist of a water-tube boiler in which case stream 9 would pass through the tubes and be vaporized in heat exchange with hot combustion gas passing external to the tubes. The invention is broadly applicable to all instances where a sulfur-containing solid carbonaceous material such as anthracite or bituminous coil, lignite or peat is burned to generate a hot combustion gas. In addition, the hot combustion gas may be alternatively employed for other purposes besides the generation of steam. Thus, in some instances stream 9 could consist of a process fluid which is heated or vaporized in tubes 8. In the particular preferred embodiment where stream 9 consists of boiler feed water and stream 10 consists of high pressure steam, stream 10 could be employed for other useful heating or power generation purposes, besides expansion in turbine 11 to drive generator 14. Finally, streams 15 or 19 may be passed through an auxiliary facility in some instances to remove larger fly ash particles, prior to passing the cooled combustion gas stream through unit 20. Typical auxiliary facilities for this purpose include cyclonic separators or wet scrubbers in which the gas stream is scrubbed with water to entrain and remove larger solid particles.

An example of an industrial application of the present invention to a steam-electric power plant will now be described.

EXAMPLE

The procedure of the present invention was applied to the design of a system for the removal by electrostatic precipitation of fly ash from flue gas generated by a steam-electric power plant which was fired with pulverized bituminous coal containing about 1.1% sulfur, measured on an ash-free and moisture-free basis. The addition of 1 part by weight of Venezuelan crude oil containing about 135 p.p.m. of vanadium to the combustion zone, for each 20 parts by weight of pulverized coal, reduced the fly ash content of the flue gas discharged after electrostatic precipitation by 65%.

I claim:
1. In a combustion process in which sulfur-containing solid carbonaceous particles containing in the range of 0.2% to 6.0% sulfur content by weight are burned in a combustion zone to generate a hot combustion gas containing sulfur dioxide and entrained solids, said hot combustion gas is cooled to provide useful heat, and the cooled combustion gas is subjected to electrostatic precipitation to remove at least a portion of said entrained solids prior to discharge of said cooled combustion gas, the improvement which comprises at least partially converting sulfur dioxide in said hot combustion gas to sulfur trioxide at a temperature in the range of about 600° F. to about 800° F. whereby improved electrostatic precipitation of said entrained solids from said combustion gas is produced, by injecting a vanadium-containing liquid hydrocarbon into said combustion zone for combustion together with said solid carbonaceous particles, said liquid hydrocarbon containing at least 50 p.p.m. of vanadium and being injected into said combustion zone at a mass flow rate which is at least 5% of the mass flow rate of said solid carbonaceous particles.

2. The process of claim 1, in which said solid carbonaceous particles consist of combustible material selected from the group consisting of coal, lignite and peat.

3. The process of claim 1, in which said vanadium-containing liquid hydrocarbon consists of a vanadium-containing crude oil.

4. The process of claim 1, in which said vanadium-containing liquid hydrocarbon consists of heavy residual oil derived from the refining of crude oil.

5. The process of claim 1, in which said sulfur-containing solid carbonaceous particles consist of pulverized coal.

6. The process of claim 1, in which said hot combustion gas is cooled in heat exchange with pressurized liquid water, whereby said liquid water is vaporized to form high pressure steam, and said high pressure steam is expanded to reduced pressure through a steam turbine, said steam turbine being connected with an electrical generator whereby electric power is generated.

7. In an electric power generating process in which sulfur-containing solid coal particles containing in the range of 0.2% to 6.0% sulfur content by weight are burned in a combustion zone to generate a hot combustion gas containing sulfur dioxide and entrained solids, said hot combustion gas is cooled in heat exchange with pressurized liquid water, whereby said liquid water is vaporized to form high pressure steam, said high pressure steam is expanded to reduced pressure through a steam turbine, said steam turbine being connected with an electrical generator whereby electric power is generated, and the cooled combustion gas is subjected to electrostatic precipitation to remove at least a portion of said entrained solids prior to discharge of said cooled combustion gas to atmosphere, the improvement which comprises at least partially converting sulfur dioxide in said hot combustion gas to sulfur trioxide at a temperature in the range of about 600° F. to about 800° F. whereby improved electrostatic precipitation of said entrained solids from said combustion gas is produced, by injecting a vanadium-containing liquid hydrocarbon into said combustion zone for combustion together with said solid coal particles, said liquid hydrocarbon containing at least 50 p.p.m. of vanadium and being injected into said combustion zone at a mass flow rate which is at least 5% of the mass flow rate of said solid coal particles.

8. The process of claim 7, in which said liquid hydrocarbon consists of crude oil.

9. The process of claim 7, in which said liquid hydrocarbon consists of heavy residual oil derived from the refining of crude oil.

10. The process of claim 7, in which said solid coal particles consist of pulverized coal.

References Cited

UNITED STATES PATENTS

| | | | |
|---|---|---|---|
| 2,746,563 | 5/1956 | Harlow | 23—175X |
| 2,926,999 | 3/1960 | Tarbutton et al. | 23—175X |
| 3,147,795 | 9/1964 | Livingston et al. | 110—22(A)X |
| 3,162,431 | 12/1964 | Muller et al. | 55—134X |
| 3,284,990 | 11/1966 | Orne | 55—5 |
| 1,045,723 | 11/1912 | McTetridge | 23—174X |
| 1,783,818 | 12/1930 | Werner | 110—22(A)X |
| 2,021,936 | 11/1935 | Johnstone | 23—175X |
| 2,220,041 | 10/1940 | Hill | 23—175X |
| 2,357,901 | 9/1944 | Lewis et al. | 110—22(A)X |
| 2,412,983 | 12/1946 | Hene | 208—14X |
| 2,449,190 | 9/1948 | Belchetz | 23—175 |
| 2,537,558 | 1/1951 | Tigges | 55—135X |
| 2,550,390 | 4/1951 | Stephanoff | 110—22(A)X |
| 2,677,434 | 5/1954 | Hedberg et al. | 55—134 |

FOREIGN PATENTS

| | | | |
|---|---|---|---|
| 1,309,372 | 10/1962 | France | 55—124 |
| 932,895 | 7/1963 | Great Britain | 55—134 |

OTHER REFERENCES

Perry, John H., editor, Chemical Engineer's Handbook, third edition, McGraw-Hill Book Company, Inc., New York, N.Y., copyright 1950, pp. 1628, 1629, 1636, and 1641.

DENNIS E. TALBERT, JR., Primary Examiner

U.S. Cl. X.R.

23—2, 175; 55—11, 135; 110—22; 122—4, 22